3,597,370
HOLLOW BODIES OF COPOLYMERS OF VINYL CHLORIDE AND ETHYLENE

Herbert Bartl, Cologne-Stammheim, Ernst Willi Müller, Leverkusen, and Frank Wingler, Cologne-Kalk, Germany, assignors to Farbenfabriken Bayer Aktiengesellschaft, Leverkusen, Germany
No Drawing. Filed July 11, 1967, Ser. No. 652,434
Claims priority, application Germany, Aug. 17, 1966, F 49,964
Int. Cl. B01v 13/02; C08v 1/26
U.S. Cl. 260—2.5      4 Claims

ABSTRACT OF THE DISCLOSURE

Copolymers of vinyl chloride and ethylene together with the optional presence of propylene in the form of hollow bodies having a bulk density of 0.005 to 0.5 g./cm.$^3$ and a diameter of 0.01 to 2 mm. and process of producing by blowing, said bodies being useful as packing material and insulating material.

---

This invention relates to difficultly combustible hollow bodies (hollow pearls) of copolymers of vinyl chloride and ethylene and optionally propylene and to a process for their production.

It is known to produce foam plastics of low bulk density which are eminently suitable for use as insulating materials, e.g. from polystyrene. One serious disadvantage is, however, that polystyrene is readily combustible. Attempts to use other polymers, e.g. polyvinyl chloride, for the same purpose have failed, because polyvinyl chloride has unsuitable physical properties for the production of foam plastics of low density, even if the polyvinyl chloride contains a plasticiser and is foamed with the aid of blowing agents.

It has now been found that difficultly combustible hollow bodies (hollow pearls) of very low bulk density and low diameter can be produced by blowing copolymers composed of 70 to 92, and preferably 80 to 90, parts by weight of vinyl chloride and 30 to 8, preferably 20 to 10, parts by weight of ethylene and optionally propylene after their production with the aid of the residual monomers being in the copolymer. The amount of the copolymerised propylene, which may be contained in the copolymer should not exceed 50% by weight of the copolymerised ethylene.

It is preferred to use copolymers of vinyl chloride and ethylene for producing hollow bodies. The residual monomers are ethylene, vinyl chloride and optionally propylene.

If desired one may additionally use blowing agents which are gaseous at room temperature and which are maintained under pressure before the blowing process or liquids which become gaseous at temperatures below 150° C. or blowing agents which liberate gases when chemically decomposed. Such compounds are aliphatic hydrocarbons with 2 to 8 carbon atoms and their halogenation products and cycloaliphatic hydrocarbons with 3 to 8 carbon atoms such as propane, pentane, hexane, methyl chloride, methylene chloride, monochlorotrifluoromethane, dichloro-difluoromethane, carbon tetrachloride, tetrachloroethylene, hexachloroethylene. Furthermore benzene, methyl acetate, acetone or mixtures of various such solvents may be used.

By compounds which split off gases are meant principally those which can be decomposed at elevated temperature to liberate nitrogen or carbon dioxide, e.g. azodicarbonamide, dinitrosopentamethylene tetramine or benzene-1,3-disulphohydrazide.

The aforementioned blowing agents may be added to the mixture for polymerising in amounts of 0.4 to 40% by weight, preferably in amounts of 1 to 10% by weight, based on the total amount of vinyl chloride, ethylene and optionally propylene. The hollow pearls obtained having a bulk density of about 0.005 to 0.04 g./cm.$^3$ do not agglutinate by adhesion. They have an excellent hardness and stiffness.

The blowing agents may be added to the monomeric vinyl chloride before polymerisation. One may, of course, also add plasticisers, stabilisers, fillers or pigments before polymerisation.

It is especially advantageous, however, to use the residual monomeric ethylene and vinyl chloride and optionally propylene contained in the copolymer after incomplete polymerisation for expanding the polymer particles immediately after polymerisation has taken place. In this procedure, vinyl chloride and ethylene are polymerised in a pressure vessel by the suspension or block polymerisation technique up to a conversion of not more than 95% of the monomers, and the pressure is then slowly released by some suitable device such as a sufficiently large valve. By this procedure hollow balls (pearls) which may have a bulk density of 0.5 to 0.005 or less and a diameter between about 0.01 and 2 mm. are obtained from the particles of copolymer.

Polymerisation is performed preferably at a low temperature, i.e. between about +20 and +70° C. in order that one may be able to use very low ethylene pressures. One may, of course, also employ higher or lower temperatures, e.g. between −30 and +100° C. It is accordingly preferred to use as reaction initiators those compounds which are capable of initiating polymerisation at low temperatures, e.g. $\alpha,\alpha'$-azodiisobutyric acid dinitrile, peroxidic dicarbonates, lauroyl peroxide, redox systems, organoboranes etc.

The best hollow bodies (pearls) are obtained if the conversion of monomers is about 20 to 80% and the particles are blown up at temperatures of about 25 to 60° C. During the expansion process, the ethylene pressure should be below 100 excess atmospheres, about 30 to 80 excess atmospheres, since otherwise the hollow bodies are broken up or cannot be formed in the first place. By this procedure, one obtains particles of about 0.01 to 2 mm. in diameter which may have bulk density of 0.1 to 0.005 g./cm.$^3$ or less.

The products according to the invention have many different fields of application, e.g. as packing material, as insulating material or for mixing with compact materials for the purpose of loosening them up, e.g. for improving garden soil. A preferred use for these products, however, is as insulating material in the building trade, where one important requirement is that the hollow bodies should be relatively difficultly combustible. Another advantage is that the vinyl chloride copolymers are more resistant to solvents, especially to hydrocarbons, than polystyrene.

EXAMPLE 1

1000 g. of softened water, 1.75 g. of methyl cellulose and 0.9 g. of dicyclohexylperoxidicarbonate are placed into a 5 litre autoclave. The air is removed by introducing ethylene under pressure and releasing the pressure for three times. 300 g. of vinyl chloride and 500 g. of ethylene are then dosed into the autoclave and heated to 50° C. while being stirred at the rate of 480 revs./min. The pressure rises to 70 excess atmospheres. After 24 hours, the reaction mixture is cooled to 28° C. within one hour, and the pressure is slowly released through a 4 mm. valve while the stirrer continues to operate. The polymer expands into a foam consisting of hollow pearls immediately on leaving the valve. The diameter of the bubbles is about 0.6 to 1 mm. After air drying, 210 g. of hollow pearls having a bulk density of 17. g./1000 cc. is obtained. Chlorine analysis shows 47.7 percent by weight of chlorine, corresponding to vinyl chloride content of 85%; Intrinsic viscosity $(\eta)=0.54$ (determined in cyclohexanone at 25° C.).

EXAMPLE 2

Using a reaction mixture prepared in a manner analogous to Example 1, a pressure in the reactor of 75 excess atmospheres was established at 52° C. After release of pressure, 170 g. of hollow pearls are obtained, with a bubble diameter of about 1 to 1.5 mm., a bulk density of 18 g./100 cc., and a Cl content of 48.72% by weight. This corresponds to a vinyl chloride content of 86.8% by weight or an ethylene content of 13.2% by weight; $(\eta)=0.591$ (cyclohexanone at 25° C.).

EXAMPLE 3

(a) 1200 parts by weight of water, 2.1 parts by weight of methyl cellulose and 1.083 parts by weight of cyclohexylperoxydicarbonate are introduced into an autoclave the volume of which being dimensioned so that the autoclave is filled up during polymerisation with liquid phase up to 50–80% by volume. After displacing the air by ethylene 360 parts by weight of vinyl chloride are added and the reaction mixture is saturated within 20 minutes, while stirring (400–500 revolutions per minute), by introducing ethylene at room temperature under a pressure of 38 excess atmospheres. The temperature is then raised to 50° C. After 24 hours the reaction mixture is allowed to cool and the polymer is released through an uptake into a storage container. Upon leaving the discharged valve the polymer particles expand into a foam consisting of hollow pearls which is dried in the atmosphere and liberated from larger particles on a sieve having a mesh size of 2 mm. diameter. There are obtained 255 parts by weight of hollow bodies of a bulk density of 0.0085 g./cm.³ and a vinyl chloride content of 84–86% by weight. The diameter of the hollow bodies is 0.5–1.2 mm.

(b) When repeating the experiment described in Example 3a, however, conducting the polymerisation in the presence of 1.08 parts by weight of azodiisobutyric acid dinitrile at 60° C. for 12 hours, there are obtained 193 parts by weight of hollow pearls with a vinyl chloride content of 89.8% by weight, a bulk density of 0.008 g./cm.³ and a particle diameter of 0.8 to 1 mm.

EXAMPLE 4

The experiment described in Example 3a is repeated with the following changes: 1200 parts by weight of water, 2.1 parts by weight of methyl cellulose and 1.08 parts by weight of cyclohexylperoxydicarbonate are placed in the autoclave. After displacing the air by ethylene, there are added 360 parts by weight of vinyl chloride, and 120 parts by weight of dichlorodifluoromethane are then introduced under pressure by means of ethylene. The reaction mixture is saturated within 30 minutes, while stirring, with 30 excess atmospheres of ethylene. Polymerising is carried out while stirring (480 revolutions per minute) at 55° C. for 8 hours. After cooling the polymer is released as described in Example 3a, 305 parts by weight of hollow pearls with a density of 0.018 g./cm.³ are obtained. The vinyl chloride content of the polymer amounts to 90.2% by weight.

EXAMPLE 5

4 g. of methyl cellulose dissolved in 4 l. of softened water are placed together with 4 g. of cyclohexylperoxydicarbonate into a 10 l. pressure vessel. The air is removed by introducing ethylene as described in Example 1. 2000 g. of vinyl chloride and 900 g. of ethylene are dosed into the vessel and polymerised for 12 hours while being stirred at a rate of 780 revs./min. After cooling to 28° C. the content is released through a 6 mm. valve. There are obtained 2000 g. of microballons with a diameter of 20–150 $\mu$ and a content of 90.7% by weight vinyl chloride. The microballons have a bulk density of 355 g./1000 cm.³.

EXAMPLE 6

The experiment described in Example 5 is repeated with the following amounts: 4.8 l. of water, 8.4 g. of methyl cellulose, 4.4 g. of cyclohexylperoxydicarbonate, 1520 cm.³ of vinyl chloride, 800 g. of ethylene and 100 g. of pentane. After polymerisation there are obtained 1520 g. of hollow pearls with a vinyl chloride content of 87.4% by weight and a diameter of 1 to 1.2 mm.

EXAMPLE 7

The experiment described in Example 5 repeated with the following changes: 4.8 l. of water, 8.4 g. of methylcellulose, 4.3 g. of cyclohexylperoxydicarbonate, 1520 cm.³ of vinyl chloride, 900 g. of ethylene and 50 g. of propane. After polymerisation and releasing the pressure at 28° C. while stirring with 380 revs./min. one obtains 300 l. of hollow pearls with a diameter of 0.5 to 1 mm.

What is claimed is:

1. A spherical particle having a continuous, hole-free self-supporting wall, said spherical particle having a bulk density of 0.005 to 0.5 g./cm.³ and a diameter of 0.01 to 2 mm. and being formed from a copolymer containing 70 to 92 parts by weight of copolymerized vinyl chloride and 30 to 8 parts by weight of copolymerized vinyl chloride and 30 to 8 parts by weight of copolymerized ethylene.

2. The spherical particle of claim 1 containing copolymerized propylene in an amount of up to 50% by weight of said copolymerized ethylene.

3. The spherical particle of claim 1 wherein said copolymer contains from 80 to 90 parts by weight of copolymerized vinyl chloride and 20 to 10 parts by weight of copolymerized ethylene.

4. The spherical particle of claim 3 containing copolymerized propylene in an amount of up to 50% by weight of said copolymerized ethylene.

References Cited

UNITED STATES PATENTS 2,797,201  6/1957  Veatch et al. _____ 260—2.5B
2,875,186  2/1959  Gerhard II et al. __ 260—92.8W JOHN C. BLEUTGE, Primary Examiner M. FOELAK, Assistant Examiner U.S. Cl. X.R.

260—80.78, 87.5